United States Patent [19]

Berg

[11] Patent Number: 5,712,562

[45] Date of Patent: Jan. 27, 1998

[54] ENCAPSULATED TRANSDUCER WITH AN ALIGNMENT PLUG AND METHOD OF MANUFACTURE

[75] Inventor: Dave Van Den Berg, Minden, Nev.

[73] Assignee: Bently Nevada Corporation, Minden, Nev.

[21] Appl. No.: 542,532

[22] Filed: Oct. 13, 1995

[51] Int. Cl.⁶ .............. G01B 7/14; G01H 11/02; G01R 3/00; B29C 45/00
[52] U.S. Cl. .............. 324/207.16; 29/595; 73/660; 73/661; 174/52.2; 264/272.15; 324/207.26
[58] Field of Search .............. 324/173, 174, 324/207.15, 207.16, 207.25, 207.26, 236, 237; 73/660, 661; 29/595, 602.1, 605, 606; 264/272.13, 272.15, 272.16, 272.19; 336/92, 96, 205; 174/52.1–52.3

[56] References Cited

U.S. PATENT DOCUMENTS

| | | | |
|---|---|---|---|
| 2,361,348 | 10/1944 | Dickson et al. | 18/30 |
| 2,890,505 | 6/1959 | Brand | 22/151 |
| 3,473,110 | 10/1969 | Hardin et al. | 324/236 |
| 3,932,828 | 1/1976 | Plunkett et al. | 336/96 |
| 4,000,877 | 1/1977 | Shead et al. | 249/82 |
| 4,162,138 | 7/1979 | Byrne | 425/125 |
| 4,377,548 | 3/1983 | Pierpont | 264/265 |
| 4,408,159 | 10/1983 | Prox | 324/207 |
| 4,419,646 | 12/1983 | Hermle | 336/90 |
| 4,470,786 | 9/1984 | Sano et al. | 425/125 |
| 4,680,543 | 7/1987 | Kohen | 324/208 |
| 4,829,245 | 5/1989 | Eshasseriau et al. | 324/174 |
| 4,847,557 | 7/1989 | Saito et al. | 324/173 X |
| 4,954,307 | 9/1990 | Yokoyama | 264/272.15 |
| 4,959,000 | 9/1990 | Giza | 425/116 |
| 5,016,343 | 5/1991 | Schutts | 29/605 |
| 5,018,049 | 5/1991 | Mehnert | 361/380 |
| 5,021,737 | 6/1991 | Schutts | 324/207.11 |
| 5,039,942 | 8/1991 | Buchschmid et al. | 324/174 |
| 5,049,055 | 9/1991 | Yokohama | 425/116 |
| 5,122,046 | 6/1992 | Lavalle et al. | 425/116 |
| 5,133,921 | 7/1992 | Yokohama | 264/272.15 |
| 5,138,292 | 8/1992 | Forster | 335/278 |
| 5,147,657 | 9/1992 | Giza | 425/117 |
| 5,151,277 | 9/1992 | Bernardon et al. | 425/112 |
| 5,182,032 | 1/1993 | Dickie et al. | 249/91 |
| 5,226,221 | 7/1993 | Kilgore | 29/605 |
| 5,240,397 | 8/1993 | Fay et al. | 425/145 |
| 5,252,051 | 10/1993 | Miyamoto et al. | 425/116 |
| 5,278,496 | 1/1994 | Dickmeyer et al. | 324/174 X |
| 5,351,388 | 10/1994 | Van Den Berg et al. | 29/602.1 |
| 5,376,325 | 12/1994 | Ormson | 264/254 |
| 5,381,089 | 1/1995 | Dickmeyer et al. | |
| 5,418,454 | 5/1995 | Togo | 324/174 X |

FOREIGN PATENT DOCUMENTS

| | | |
|---|---|---|
| 2576245 | 7/1986 | France . |
| 3064279 | 6/1978 | Japan . |
| 6037130 | 7/1992 | Japan . |
| 1313748 | 4/1973 | United Kingdom . |
| 1353603 | 5/1974 | United Kingdom . |
| 8403794 | 9/1984 | WIPO . |

*Primary Examiner*—Gerard R. Strecker
*Attorney, Agent, or Firm*—Bernhard Kreten

[57] ABSTRACT

The encapsulated transducer (10) includes an injection molded encapsulation (20) having a front end (22) and a back end (24). The encapsulation (20) ensconces a sensing element (40) proximate the front end (22) and a portion of a cable (60) which extends from the back end (24). The sensing element or coil (40) is electrically and mechanically connected to the cable (60) by a pair of suitably sized front and rear ferrules (80), (90) secured to a center and coaxial conductor (66), (70) of the associated cable (60) thereby forming a coil and cable assembly (110). At least the rear ferrule (90) includes a shoulder (100) for firmly anchoring the coil and cable assembly (110) within the encapsulation (20). In addition an injection molding process provides the durable encapsulation (20) which bonds with a dielectric (68) of the cable (60) and symmetrically locks the coil and cable assembly (110) therein.

34 Claims, 8 Drawing Sheets

ENCAPSULATED TRANSDUCER WITH AN ALIGNMENT PLUG AND METHOD OF MANUFACTURE

FIELD OF THE INVENTION

The present invention relates generally to an encapsulated transducer with an alignment plug and, in particular, to an encapsulated transducer substantially impervious to any mechanical, physical or chemical aggressions from the surrounding environment and a method of manufacturing such transducer which is used to monitor vibration of rotating and recipocating machinery, temperature sensing and the monitoring and sensing of other physical phenomenon.

BACKGROUND OF THE INVENTION

Monitoring and diagnosing the status of rotating and reciprocating machinery start with accurate and dependable measurements from a transducer and its associated electronics and then precede to other sophisticated analyzing apparatus for reduction and display. One such transducer is a proximity transducer which may be utilized for, inter alia, monitoring the vibration characteristics of a rotating shaft of a machine. In this environment, the transducer must operate under very adverse physical, chemical and mechanical conditions and it is often very difficult to replace such transducers. Thus, there is an ongoing effort to make the proximity transducer one of the most reliable parts of the monitoring system.

Typically, the proximity transducer, in conjunction with associated electronics, outputs a signal correlative to the spacing between an object or "target" (the rotating shaft of the machine) and a sensing coil of the proximity transducer. It is critical that the length or spacing between the target and the sensing coil of the proximity transducer remains within the linear range of the transducer for providing accurate and reliable measurements when in operation. Thus, one hallmark for providing accurate and reliable measurements relies on providing a transducer which is impervious to the predations of the environment and which does not consume an inordinate amount of the linear range of the transducer.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

U.S. PATENT DOCUMENTS

| DOCUMENT NO. | DATE | NAME |
| --- | --- | --- |
| 2,361,348 | October 24, 1944 | Dickson et al. |
| 2,890,505 | June 16, 1959 | Brand |
| 3,932,828 | January 13, 1976 | Plunkett et al. |
| 4,000,877 | January 4, 1977 | Shead et al. |
| 4,162,138 | July 24, 1979 | Byrne |
| 4,377,548 | March 22, 1983 | Pierpont |
| 4,408,159 | October 4, 1983 | Prox |
| 4,419,646 | December 6, 1983 | Hernle |
| 4,470,786 | September 11, 1984 | Sano et al. |
| 4,680,543 | July 14, 1987 | Kohen |
| 4,829,245 | May 9, 1989 | Echasseriau et al. |
| 4,954,307 | September 4, 1990 | Yokoyama |
| 4,959,000 | September 25, 1990 | Giza |
| 5,016,343 | May 21, 1991 | Schutts |
| 5,018,049 | May 21, 1991 | Mehnert |
| 5,021,737 | June 4, 1991 | Schutts |
| 5,039,942 | August 13, 1991 | Buchschmid, et al. |
| 5,049,055 | September 17, 1991 | Yokoyama |
| 5,122,046 | June 16, 1992 | Lavallee et al. |
| 5,133,921 | July 28, 1992 | Yokoyama |
| 5,138,292 | August 11, 1992 | Forster |
| 5,147,657 | September 15, 1992 | Giza |
| 5,151,277 | September 29, 1992 | Bernardon, et al. |
| 5,182,032 | January 26, 1993 | Dickie et al. |
| 5,226,221 | July 13, 1993 | Kilgore |
| 5,240,397 | August 31, 1993 | Fay et al. |
| 5,252,051 | October 12, 1993 | Miyamoto et al. |
| 5,351,388 | October 4, 1994 | Van Den Berg, et al. |
| 5,376,325 | December 27, 1994 | Ormson |

FOREIGN PATENT DOCUMENTS

| DOCUMENT NO. | DATE | COUNTRY |
| --- | --- | --- |
| UK 1 313 748 | April 18, 1973 | Great Britain |
| UK 1 353 603 | May 22, 1974 | Great Britain |
| JA-139710 | August 6, 1978 | Japan |
| WO 84/03794 | September 27, 1984 | PCT |
| FR 2576-245-A | July 25, 1986 | France |
| JA 6-37130-A | October 2, 1994 | Japan |

The two patents to Schutts and the patent to Van Den Berg, et al. reflect assignee's ongoing commitment to providing an accurate sensor which is impervious to predations of the environment.

The French patent to Jaeger teaches the use of a method and apparatus for injection molding of an elongated detector with a sensor at one end. One end of the detector is supported by the mold while the sensor end is engaged by a centering sleeve (130). The centering sleeve (130) terminates in a piston (132) which is mobile in a cylinder (126) and slides about a fixed rod (138). Thermoplastic is injected into the mold and the centering sleeve is removed from the sensor when the injection process is only partially complete.

The Japanese patent to Kawakami teaches the use of sealing a semiconductor chip by transfer molding. A semiconductor chip (4) is mounted on a carrier (1) and is held at a fixed position via mobile pins (17) and (18). The mobile pins (17) and (18) are movably fitted to a top force (11) and a bottom force (12) for freely advancing or retracting the pins into and out of the cavities (15) and (16). While the pins (17) and (18) are in contact with the carrier (1), a resin (20) is injected into the cavities (15) and (16) through gates (13) and (14) and the pins (17) and (18) are gradually retracted in accordance with the injecting state of resin (20).

The patent to Yokoyama teaches the use of an apparatus for manufacturing plastic encapsulated electronic semiconductor devices. A support pad (11) is firmly fixed by first and second sliders (24A) and (24B) and also by mold halves (19) and (20). The first and second sliders (24A) and (24B) are moved outwardly of a cavity (25) when the cavity is half filled with the plastic encapsulating material. Spaces, which are formed after movement of the sliders, are filled with the plastic encapsulating material directly poured through a gate (23). It should be noted that the sliders (24A), (24B) perform two functions in the cavity (25). The first function is to firmly grasp a thin end portion of the support pad (11) thereby fixing same in position and the second function is to narrow a passage through the gate (23).

The patent to Pierpont teaches the use of a method for encapsulating an electrical component having radial leads. A large multi-cavity mold is loaded with a plurality of horizontal radially leaded capacitors. The closed mold grips the leads (15). A top pin (25) pushes each component body downward a predetermined degree so that each body is left in about the same position within the corresponding mold cavity. A bottom pin (28) then pushes each component body upwardly only slightly above a center of the mold cavity so that upon bottom pin withdrawal, stresses within the lead wires of the electrical component cause the component bodies to spring back just to the mold cavity center portion. Molding resin is then introduced.

The other prior art listed above, but not specifically discussed, teach other sensor devices and molding processes and further catalog the prior art of which the applicant is aware. These references diverge even more starkly from the references specifically distinguished above.

SUMMARY OF THE INVENTION

The present invention is distinguished over the known prior art in a multiplicity of ways. For one thing, the present invention provides a transducer including a protective seamless encapsulation ensconcing a sensing element at one end and a cable extending out of the other end. In addition, the sensing element is symmetrically disposed about a long axis of the transducer and the seamless encapsulation includes an integrally formed protective wall having an uniform thickness along a forwardmost portion of the sensing element. The sensing element is electrically coupled to the cable for transmitting signals from the sensing element to an electrical processing unit. The signals can be correlative of, for example, machine vibration.

Preferably, the sensing element is in the form of a sensing coil having a front face, a back face, and a body having an outer surface and a center void extending through the body. The body extending between the front face and the back face. The sensing coil further includes at least a first lead and a second lead extending from the sensing coil and separated from one another. The leads of the coil preferably extend beyond the back face of the coil and are spaced from one another. The cable is preferably a triaxial cable comprised of an outer protective jacket circumscribing an interior of the cable which includes three concentrically disposed conductors separated from one another by at least two concentrically disposed insulators. Specifically, the outer protective jacket circumscribes the concentrically disposed triaxial, coaxial and center conductor which are separated from one another by an insulator and a dielectric interposed between the triaxial and coaxial conductors and the coaxial and center conductors, respectively. The dielectric is preferably formed from Teflon® which has been etched.

At least one end of the cable is stripped in a steplike fashion to expose a length of the center conductor, the dielectric, the coaxial conductor, the insulator and the triaxial conductor. In addition, the encapsulated transducer includes a front ferrule having a bore with an inner diameter substantially equal to the outer diameter of the center conductor and a rear ferrule having a bore with an inner diameter substantially equal to the outer diameter of the coaxial conductor. The front and the rear ferrules are then inserted onto the stripped end of the cable and soldered to the center conductor and the coaxial conductor respectively.

Once the solder has made a permanent mechanical and electrical connection between the front and rear ferrules and the respective conductors, the sensing coil is resistance welded to the ferrules. This is accomplished by resistance welding one lead of the coil to the front ferrule and the other lead of the coil to the rear ferrule.

Once the process of electrically and mechanically coupling the coil to the cable is completed, the coil is located within a mold and then an alignment plug is molded over the coil and cable. Specifically, the coil is located within the mold by placing the coil on a pin of the mold such that the pin is received within the center avoid of the coil. The pin supports the coil and axially aligns the coil with respect to the leading portion of the cable operatively coupled to the coil. Moldable material is then emitted into the mold to ensconce the coil and the leading portion of the cable thus forming the alignment plug. A portion of the mold or an insert abuts against the front face of the coil to prevent the moldable material from covering the front face of the coil while forming the alignment plug. In addition, the mold is provided with protrusions which form corresponding indentations in the alignment plug. The indentations are precisely located at a predetermined distance from the front face of the coil to effectively locate the aligned coil and cable assembly in an injection mold.

The injection mold is defined by an upper mold plate having an upper cavity and a lower mold plate having a lower cavity. The upper and lower cavities form a mold cavity when in the closed position which is complementary to the desired form of the encapsulation of the aligned coil and cable assembly. The mold cavity is defined by an upper wall, a lower wall, a front wall and a back wall having an opening extending therethrough. Preferably, the upper mold plate and the lower mold plate are each provided with at least one slideable support pin which extends into the respective upper or lower cavity of the mold and when retracted conforms to the desired shape of the respective upper or lower wall of the mold cavity. In addition, a slideable locator pin is provided adjacent the front wall of the cavity and is capable of telescoping into and out of the cavity when the mold is in the opened position. Preferably, the locator pin is comprised of a pair of concentrically disposed pins in which an inner pin extends further into the cavity than an outer pin.

The aligned coil and cable assembly is placed into the lower cavity of the lower mold plate such that the cable of the aligned coil and cable assembly extends out the opening of the back wall of the mold cavity. The coil of the assembly is centered by way of the slideable locator pin extending into the lower cavity and having the outer pin abutting the front face of the coil and the inner pin being received within the void of the coil. In addition, at least one slideable support pin is extended into the lower cavity and placed in engagement with at least one indentation provided in the alignment plug for supporting and locating the aligned coil and cable assembly. Note that once the slideable locator pin has centered the coil and spaced it a predetermined distance from the front wall of the mold cavity it is withdrawn and the injection mold is closed. The slideable support pin in the upper mold plate is extended into the upper mold cavity and comes into engagement with the indentation provided in the alignment plug when the injection mold is closed. This provides additional means for supporting and locating the coil and cable assembly within the mold cavity such that there is a void completely surrounding the assembly (except of course where the pins are touching the assembly). Note that the location and the number of the slideable support pins may be configured to best support the assembly being encapsulated within the cavity.

Once the mold is in the closed position a self-bonding moldable material is injected into the mold cavity via runners and gates. This process is continued until the mold cavity is completely filled and the coil and cable assembly is completely ensconced within the moldable material. The slideable support pins are then retracted flush with the respective upper and lower walls of the mold cavity prior to the moldable material solidifying. Note that an additional charge of moldable material may be injected into the mold as the support pins are being withdrawn so as to accommodate for any additional material needed to completely fill the voids left by the previously extended support pins. Once the process of injecting the moldable material into the cavity is completed and the support pins have been retracted, the mold may be opened and the encapsulated transducer allowed to cool in the lower mold plate. Once the encapsulated transducer is cooled one or more bottom support pins may be actuated to eject the encapsulated transducer therefrom.

Preferably, the moldable material is polyphenylene sulfide (PPS) and includes a percentage of Teflon®. The Teflon® provides a strong bond between the encapsulation and the etched Teflon®dielectric of the cable. In addition, the rear ferrule includes a shoulder which firmly anchors the coil and cable assembly within the encapsulation for resisting axial forces applied to the encapsulation and/or cable.

OBJECTS OF THE INVENTION

A primary object of the present invention is to provide a new and novel encapsulated transducer with an alignment plug and a method of manufacturing same.

A further object of the present invention is to provide an encapsulated transducer as characterized above which has an injection molded encapsulation ensconcing a sensing coil at one end and a cable extending out of the other end, one end of the cable being electrically connected to the sensing coil within the encapsulation and the other end connected to an electrical processing unit distal from said encapsulation.

Another further object of the present invention is to provide an encapsulated transducer wherein the encapsulation provides a seamless sealing envelope around the sensing coil and an end portion of the cable thus providing an impervious seal against any mechanical, physical or chemical aggressions from the surrounding medium.

Another further object of the present invention is to provide an encapsulated transducer as characterized above wherein the coil and cable are centered within the encapsulation and wherein a distance between the front face of the sensing coil and a front face of the encapsulation is held to a very close tolerance which is reproducible from one transducer to another in mass production.

Another further object of the present invention is to provide an encapsulated transducer as characterized above which is comparatively less expensive to manufacture than existing transducers for use in monitoring and diagnosing the status of rotating and reciprocating machinery and which also lends itself to rapid mass production techniques.

Another further object of the present invention is to provide the alignent plug which axially aligns the sensing coil with respect to the leading portion of the cable operatively coupled to the coil.

Another further object of the present invention is to provide an encapsulated transducer wherein the encapsulation precludes fluid from permeating therethrough and being wicked up by the cable and transported from within a machine environment to the outside environment where it becomes a source of pollution.

Another further object of the present invention is to provide an encapsulated transducer wherein the encapsulation strongly bonds to a dielectric of the cable for providing a leak tight seal and resisting axial forces.

Another further object of the present invention is to provide an encapsulated transducer having an electrical connection between at least one lead of the sensing coil and at least one conductor of the cable which provides internal connection strength which anchors the cable within the encapsulation for resisting axial forces applied to the encapsulation or cable which may cause the electrical connections to completely or partially break resulting in an inoperative or unreliable transducer.

Another further object of the present invention is to provide an encapsulated transducer which is able to be mass-produced with reproducible operational characteristics without appreciable alterations of the signal they emit when in operation.

Another further object of the present invention is to maintain a predetermined linear range capability for each manufactured transducer.

Another further object of the present invention is to provide a slideable location pin which centers and locates the coil within the mold cavity prior to the injection molding process.

Another further object of the present invention is to provide a plurality of slideable support pins for supporting and centering the coil and cable assembly during the injection molding process.

Another further object of the present invention as characterized above is to provide an injection molding step which forms the encapsulation of the sensing coil and an end portion of the cable.

Viewed from a first vantage point, it is an object of the present invention to provide a transducer for monitoring the status of rotating equipment, comprising in combination: a sensing element; first and second leads extending from the sensing element; a cable operatively coupled to the leads, an alignment plug capturing the sensing element and a portion of the cable, and a monolith of cured moldable material ensconcing the sensing element and a portion of the cable defining a seamless mass circumscribing the sensing element and a portion of the cable.

Viewed from a second vantage point, it is an object of the present invention to provide an encapsulated transducer for use in monitoring the status of rotating equipment in a harsh environment with an alignment plug having a leading end with an active element and a trailing end with an information transmitting medium emanating therefrom, formed by: integrally forming a locating means proximate the active element; locating the active element in a mold cavity with the locating means coupled thereto, assuring proper registry in the mold cavity; integrally forming a supporting means proximate the alignment plug; further supporting and locating the active element and the alignment plug in the mold cavity with the support means and removing the locator means; molding over the active element, the alignment plug and a portion of the information transmitting medium with a moldable material except for an area of support; removing the support means; injecting moldable material adjacent the support means for filling in the areas heretofore occupied by the support means; whereby the active element is precisely located in a moldable material to accurately address the rotating equipment.

Viewed from a third vantage point, it is an object of the present invention to provide a transducer for monitoring the status of rotating equipment wherein a shaft of the rotating equipment is exposed to the transducer, comprising, in combination: means for mounting the transducer a distance from the shaft such that a tangent of the shaft is perpendicular to a long axis of the transducer, the transducer having a sensing coil located proximate the shaft, a front portion of the transducer including a protective wall having uniform thickness along a forwardmost portion of the sensing coil, the sensing coil symmetrically disposed about the long axis, and a protective seamless encapsulation integrally formed with the protective front wall ensconcing the sensing coil and a leading portion of a cable operatively coupled to the sensing coil, an alignment plug embedded within the encapsulation and uniting the coil to the cable, and the cable extending away from the transducer to an electrical processing unit.

Viewed from a fourth vantage point, it is an object of the present invention to provide a transducer formed from injection molding, the forming steps including: attaching a coil to a conductor of a cable via an alignment plug, centering the coil within a mold cavity with a coil support, supporting the cable within the mold cavity with plural cable supports, orienting the cable to extend out from the mold cavity, retracting the coil support, injecting moldable material into the cavity of the mold to precisely ensconce the coil and the conductor, retracing the plural cable supports from the cable after the moldable material has been injected into the mold cavity, injecting moldable material adjacent the cable supports for filling in the areas heretofore occupied by the plural cable supports, allowing the moldable material to set, removing the thus-formed transducer from the mold as an integrated unit.

These and other objects will be made manifest when considering the following detailed specification when taken in conjunction with the appended drawing figures.

DESCRIPTION OF PREFERRED EMBODIMENTS

Considering the drawings, wherein like reference numerals denote like parts throughout the various drawing figures, reference numeral 10 is directed to the encapsulated transducer according to the present invention.

Figure 2:
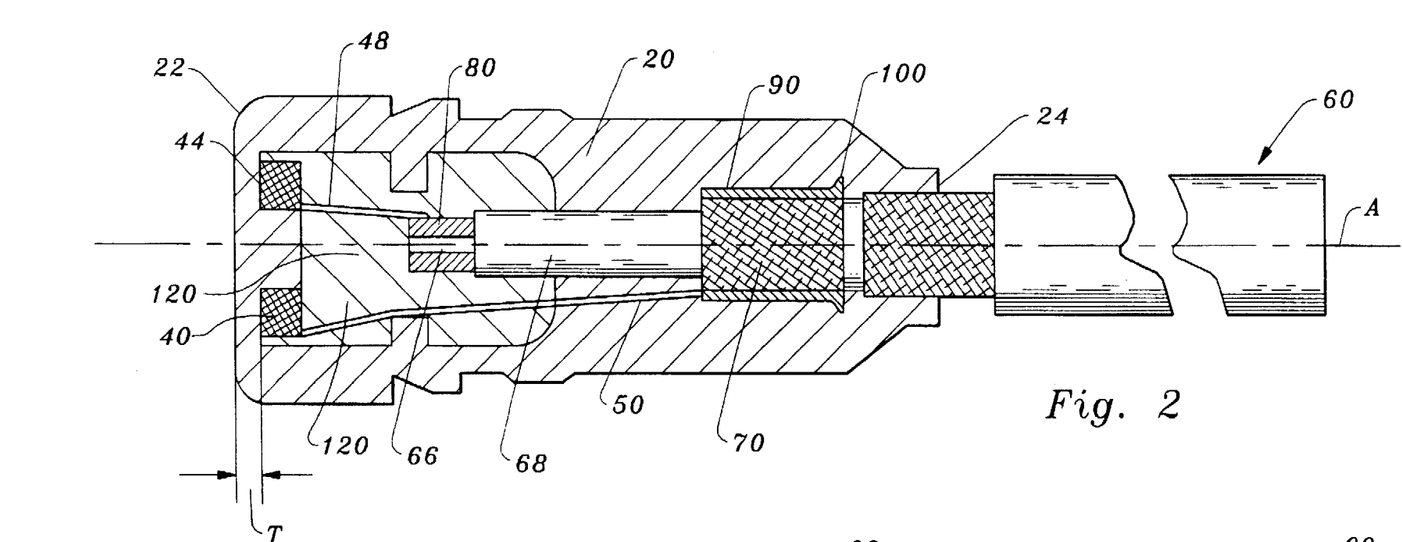
FIG. 2 is a partial sectional view of the encapsulated transducer according to the present invention.
Figure 5:
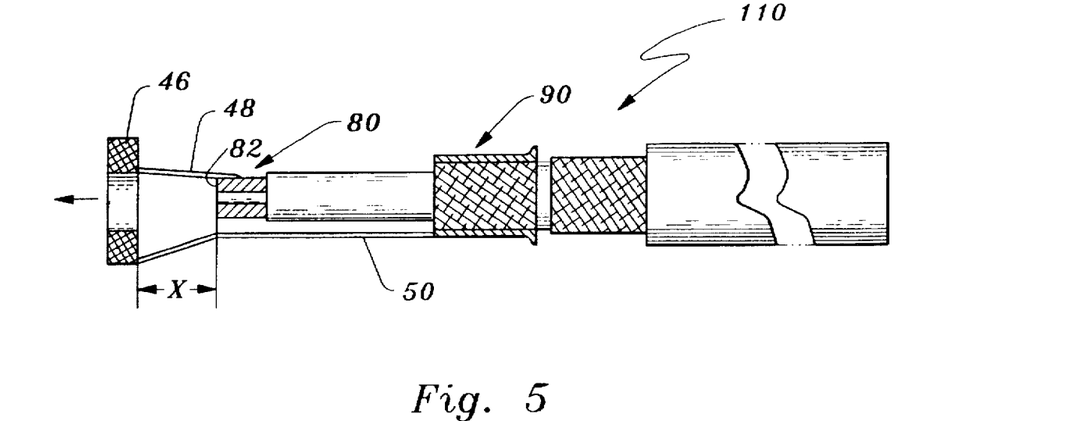
FIG. 5 is a elevational view of a sensing coil and cable assembly formed by the combination of elements as shown in FIG. 4.
Figure 6:
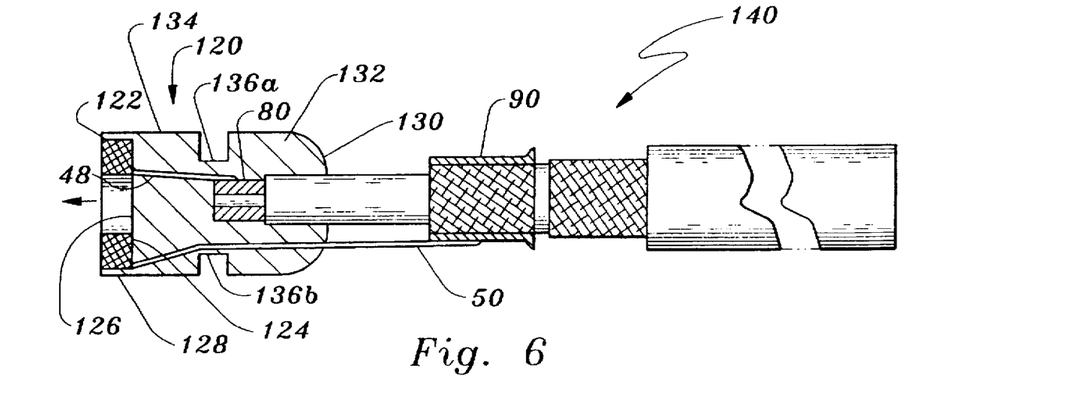
FIG. 6 is a partial sectional view of the alignment plug formed with the combination of elements as shown in FIG. 5.

In essence, and referring to FIG. 2, the encapsulated transducer 10 includes an injection molded encapsulation 20 having a front end 22 and a back end 24. The encapsulation 20 is a monolith of cured moldable material ensconcing a sensing element 40 proximate the front end 22 and a portion of an information transmitting medium 60 emanating from the back end 24. The sensing element or coil 40 is electrically and mechanically connected to the information transmitting medium or cable 60 by a pair of suitably sized front and rear ferrules 80, 90 secured to a center and coaxial conductor 66, 70 of the associated cable 60 thereby forming a coil and cable assembly 110 (FIG. 5). An alignment plug 120 is symmetrically disposed within the encapsulation 20 and aligns the coil 40 along a long axis "A" of the transducer 10 thereby forming an aligned coil and cable assembly 140 (FIG. 6). In addition, the alignment plug 120 rigidly spaces the coil 40 a predetermined distance from the front ferrule 80. At least the rear ferrule 90 includes a shoulder 100 for firmly anchoring the coil and cable assembly 110 within the encapsulation 20. In addition an injection molding process provides the durable encapsulation 20 which bonds with itself and with a dielectric 68 of the cable 60 and symmetrically locks the aligned coil and cable assembly 140 therein.

Figure 3:
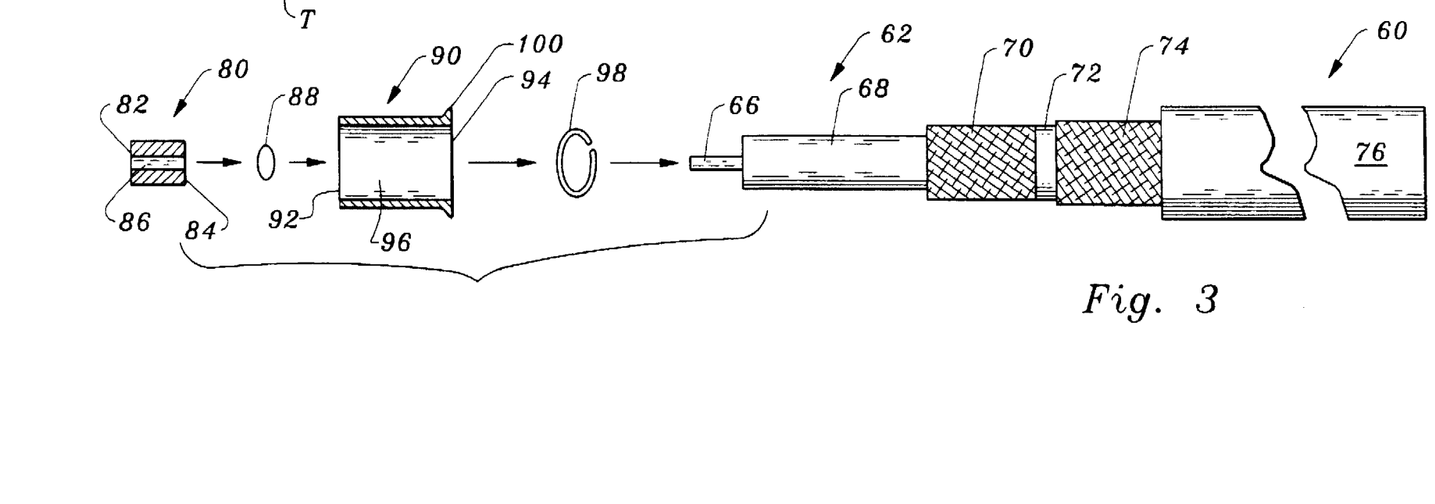
FIG. 3 is an exploded parts view of a portion of FIG. 2 illustrating certain parts in section.

More specifically, and referring to FIG. 3, the cable 60 is preferably a triaxial cable comprised of an outer jacket 76 circumscribing an interior of the cable which includes three concentrically disposed conductors 66, 70 and 74 separated from one another by at least two concentrically disposed dielectrics or insulators 68, 72. Particularly, the outer protective jacket 76 circumscribes the concentrically disposed triaxial, coaxial and center conductors 74, 70 and 66 which are separated from one another by an insulation 72 and a dielectric 68 interposed between the triaxial and coaxial conductors 74, 70 and the coaxial and center conductors 70, 66, respectively. The coaxial and triaxial conductors 70, 72 are preferably braided conductors. The dielectric 68 is preferably made from a Teflon® material which has been etched for bonding purposes. As shown in FIG. 3, at least one end 62 of the cable 60 is stripped in a steplike fashion to expose a length of the center conductor 66, the dielectric 68, the coaxial conductor 70, the insulator 72 and the triaxial conductor 74.

Figure 4:
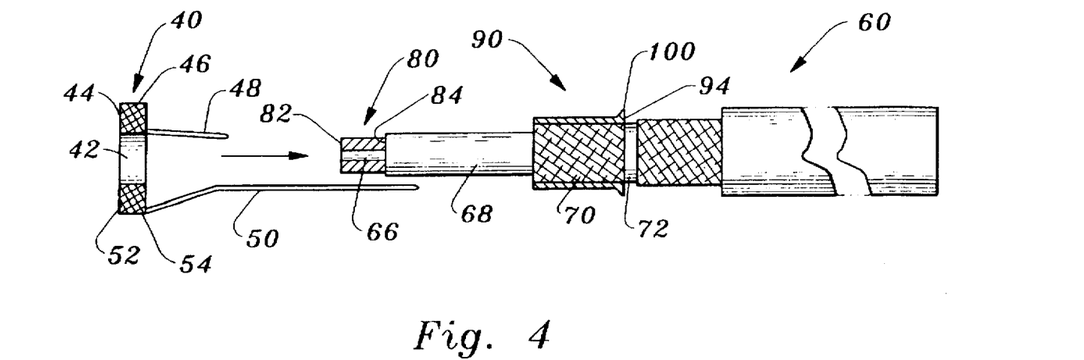
FIG. 4 is a diagrammatic view of an assembly step of the present invention and an elevational view of the combination of elements as shown in FIG. 3.

Referring to FIGS. 3 and 4, the rear ferrule 90 includes a bore 96 with an inner diameter substantially equal to an outer diameter of the coaxial conductor 70. The rear ferrule 90 is preferably connected to the coaxial conductor 70 such that an end 94 of the rear ferrule 90 abuts the insulator 72. The front ferrule 80 includes a bore 86 with an inner diameter substantially equal to the outer diameter of the center conductor 66. The front ferrule 80 is connected to the center conductor 66 such that a back end 84 of the front ferrule 80 abuts the dielectric 68 of the cable 60.

The process of electrically and mechanically connecting the front and rear ferrules 80, 90 to their respective conductors 66, 70 is as follows. A preformed rear solder ring 98 is inserted onto the stripped end 62 of the cable 60 such that it encircles the coaxial conductor 70 and abuts against the coaxial insulator 72. The rear ferrule 90 is then inserted onto the stripped end 62 of the cable 60 such that it encircles the coaxial conductor 70 and comes into engagement with the preformed rear solder ring 96. A preformed front solder ring 88 is then inserted onto the stripped end 62 of the cable 60 such that it encircles the center conductor 66 and abuts against the dielectric 68. The front ferrule 80 is then inserted onto the stripped end 62 of the cable 60 such that it also encircles the center conductor 66 and comes into engagement with the preformed front solder ring 88. This completed cable assembly is positioned in an inductive heating unit where the solder rings 88, 98 are melted and permeate into the adjacent areas between the bores 86, 96 of the front and rear ferrules 80, 90 and the center and coaxial conductors 66, 70 respectively. When the preformed front and rear solder rings 88, 98 have melted a small amount of axial force is applied to the front and rear ferrules 80, 90 so that the back end 84 of the front ferrule 80 abuts against the dielectric 68 and the back end 94 of rear ferrule 90 abuts against the coaxial conductor 70. Once the solder is cooled it locks the rear ferrule 90 to the coaxial conductor 70 and the front ferrule 80 to the center conductor 66 in a spaced coaxial proximity from one another. Preferably, both ferrules 80, 90 are formed from brass. In addition, the use of preformed solder rings 88, 98 helps to provide effective repeatability of the electromagnetic characteristics of the encapsulated transducer 10 especially with respect to the inductance parameter of the sensing coil 40.

Once a permanent mechanical and electrical connection has been made between the front and rear ferrules 80, 90 and the respective conductors 66, 70, the sensing coil 40 is resistance welded to the front and rear ferrules 80, 90. Referring to FIGS. 4 and 5, the sensing coil 40 includes a front face 44, a back face 46 and a body 52 having an outer surface 54 and a center void extending therethrough. The body 52 extends between the front face 44 and the back face 46. A first lead 48 and a second lead 50 extends beyond the back face 46 of the coil 40 and are spaced apart from one another. The coil 40 and the cable 60 are supported by a fixture (not shown) so that the back face 46 of the coil 40 and a front end 82 of the front ferrule 80 are held at a constant distance "X" (FIG. 5). The fixture substantially maintains this distance "X" when the first lead 48 is resistance welded to the front ferrule 80 and the second lead 50 is resistance welded to the rear ferrule 90. As noted above, resistance welding is used to connect the leads 48, 50 to the respective ferrules 80, 90 however, solder or laser welding may also be used.

Figure 7:
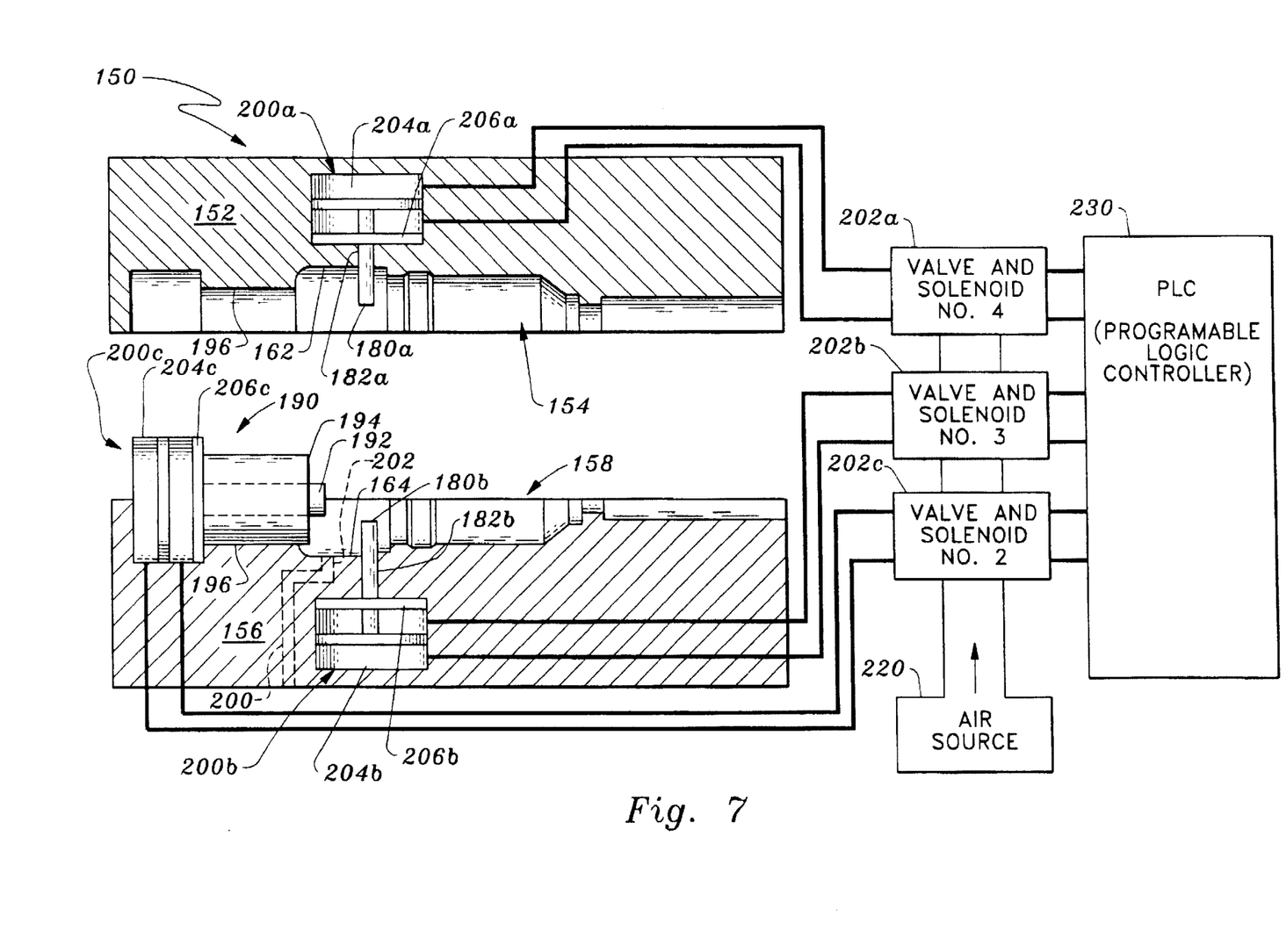
FIG. 7 is a simplified cross-sectional view of a mold in an open position and having all included slideable support and locator pins in an extended position.

Referring to FIG. 7, once the process of electrically and mechanically coupling the coil 40 to the cable 60 is completed, the coil 40 is located within a mold, for example, mold 150 having an upper and lower cavity 152, 154 shaped complementary in form to an alignment plug 120 which is molded over the coil 40 and cable 60. Specifically, the coil 40 is located within the mold by placing the coil 40 on a pin of the mold such that the pin is received within the center void 42 of the coil 40. The pin supports the coil 40 and axially aligns the coil 40 with respect to the leading end 62 of the cable 60 operatively coupled to the coil 40. Moldable material is then emitted into the mold to ensconce the coil 40 and a portion of the leading end 62 of the cable 60. Referring to FIG. 7, a portion of the mold or an insert abuts against the front face 44 of the coil 40 to preclude the moldable material from contacting or covering the front face 44 of the coil 40 while forming the alignment plug 120 (please see FIG. 7). In addition, the mold is provided with protrusions which form the corresponding indentations 136a, 136b in the alignment plug 120. The indentations 134a, 134b are precisely located at a predetermined distance from the front face 44 of the coil 40 to effectively locate the aligned coil and cable assembly 140 in an injection mold 150 (please see FIG. 7). Moreover, the constant distance "X" between the back face 46 of the coil 40 and the front end 82 of the front ferrule 80 is rigidly maintained by the alignment plug 120. Thus, the distance "X" between the back face 46 of the coil 40 and the remaining metal portions of the coil and cable assembly 110 provide an electromagnetic relationship of the coil 40 which is repeatedly and precisely fixed.

The alignment plug 120 includes a front end 122 having an annular recess 124 defined by a center post 126 and an outer peripheral wall 128. The center post 126 extends within the center void 42 of the coil 40 and the outer peripheral wall 128 contacts and contours to the outer surface 54 of the coil 40 and uniformly extends parallel to an outer surface 134. The alignment plug 120 further includes a back end 130 circumscribing a length of the leading end 62 of the cable 60 and a medial portion 132 integrally formed with and interposed between the front end 122 and the back end 130 of the alignment plug 120.

Figure 8:
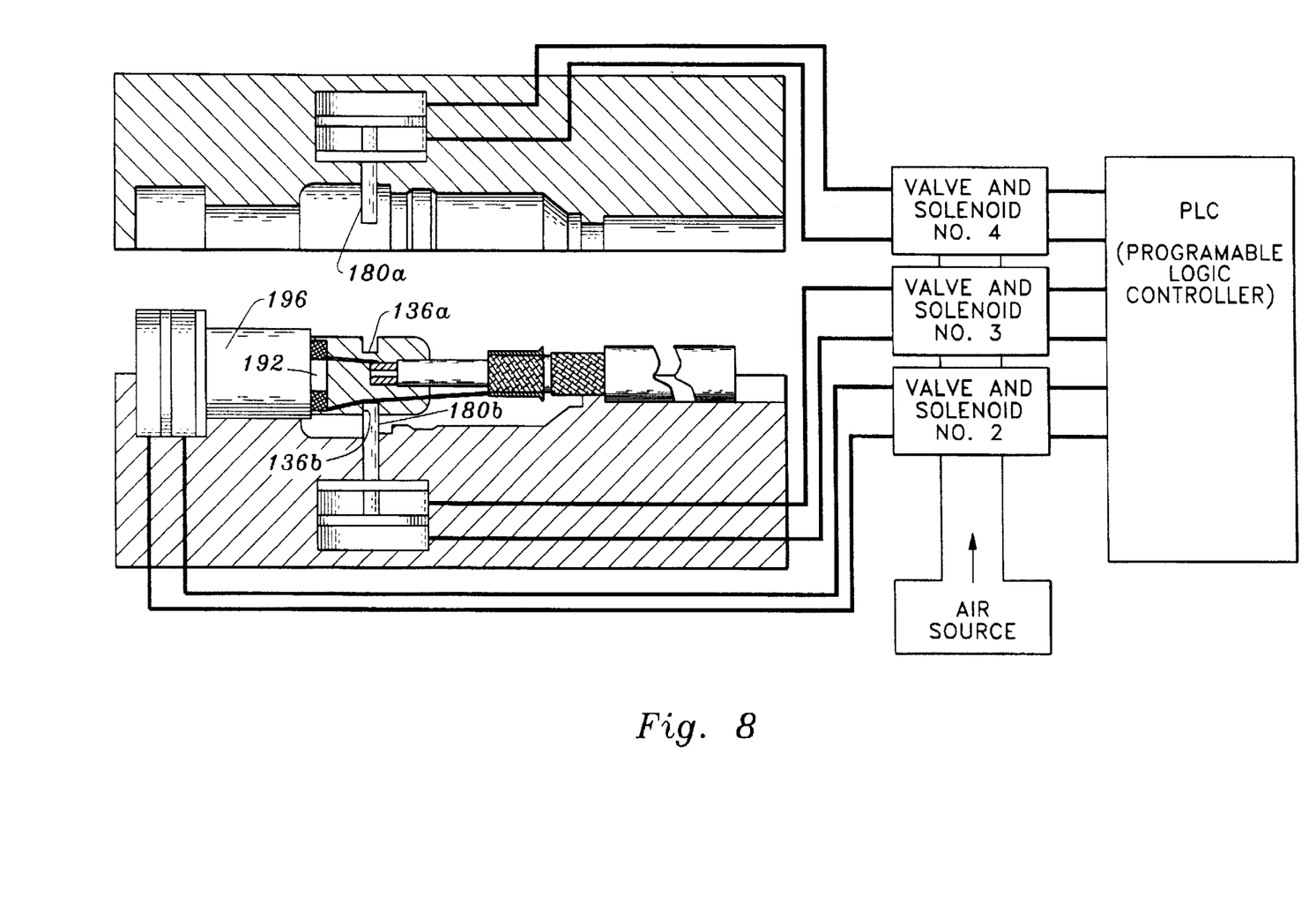
FIG. 8 is a view of the mold with the slideable support pins centering and supporting that which is shown in FIG. 6.
Figure 9:
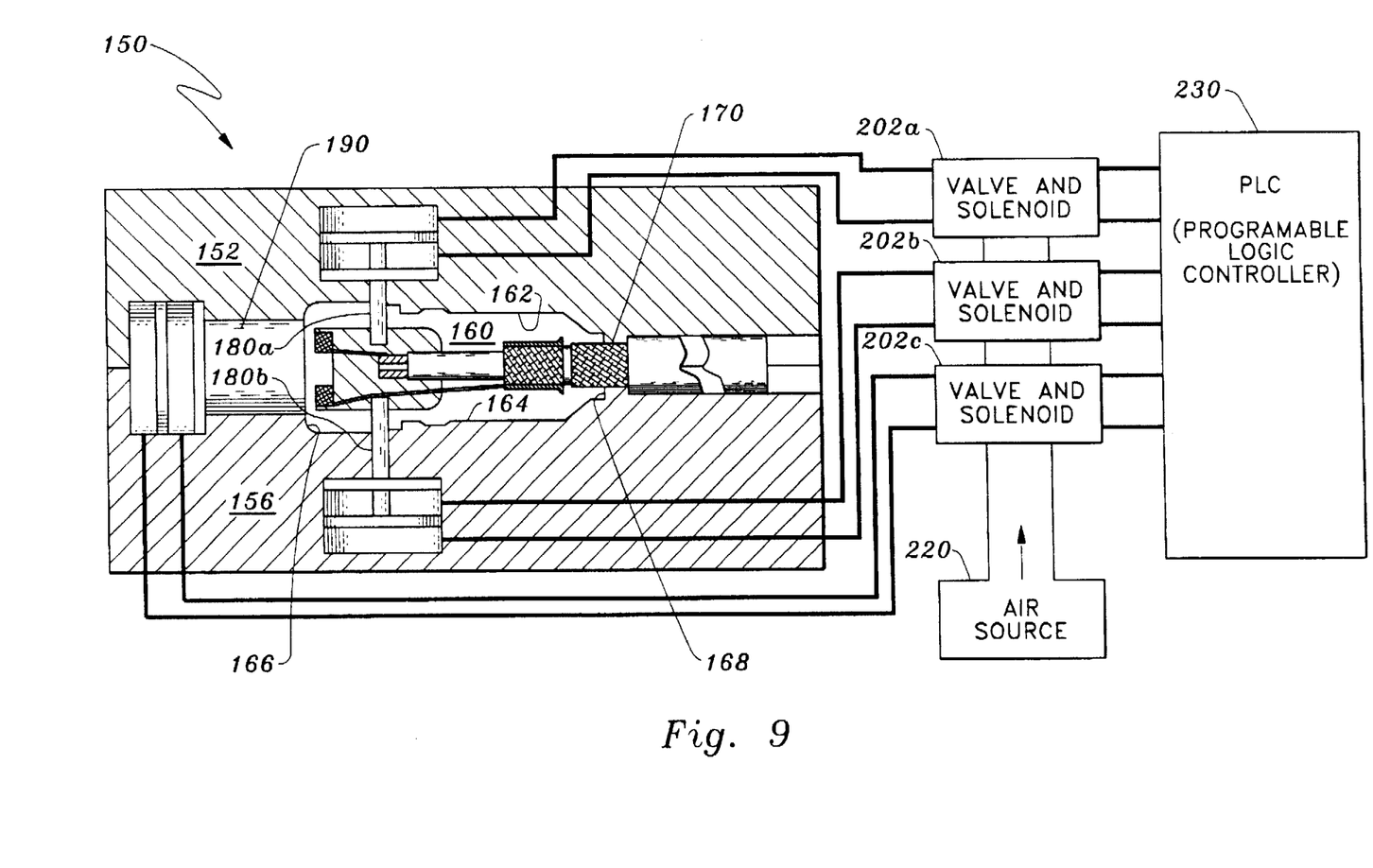
FIG. 9 is a simplified cross-sectional view of the mold in a closed position with the slideable locator pin retracted from engagement of the sensing coil.

Referring to FIGS. 7 through 9, the injection mold 150 is defined by an upper mold plate 152 having an upper cavity 154 and a lower mold plate 156 having a lower cavity 158 forming a single mold cavity 160 when in the closed position. The mold cavity 160 is shaped complementary to the desired form of the encapsulation 20 of the aligned coil and cable assembly 140. The mold cavity 160 is defined by an upper wall 162, a lower wall 164, a front wall 166 and a back wall 168 having an opening 170 extending therethrough (FIG. 9).

The upper mold plate 152 is provided with at least one sleeve 182a through which at least one slideable support pin 180a may be moved into or out of the upper cavity 154 by a drive means 200a. The lower mold plate 156 is provided with at least one sleeve 182b through which at least one slideable support pin 180b may be moved into or out of the lower cavity 158 by corresponding drive means 200b. In addition, the injection mold 150 is provided with a slideable locator pin 190 which is preferably disposed on the lower mold plate 156 at a location adjacent the front wall 166 of the mold cavity 160. The slideable locator pin 190 preferably includes a pair of concentrically disposed slideable pins 192, 194 in which an inner pin 192 slides within an outer pin 194 which in turn slides within a sleeve 196. Both the inner pin 192 and the outer pin 194 may be moved by an associated drive means 200c such that they are capable of extending into or out of the lower cavity 158 when the mold 160 is in the opened position. Preferably, the inner pin 192 is capable of extending further into the lower cavity 158 than the outer pin 194.

Alternatively, the slideable locator pin 190 may be an integrally formed T-shaped pin having a top branch resembling the outer pin 194 and a base branch resembling the inner pin 192 in an extended and rigidly fixed position with respect to the top branch.

The slideable support pins 180a, 180b and the slideable locator pin 190 are each preferably provided with separate drive means, 200a–200c respectively and may be independently controlled by a programmable logic controller (PLC) 230 or the like.

Each drive means 200a–200c includes a valve and solenoid unit 202a–202c, a pneumatic cylinder 204a–204c and an ejector plate 206a–206c. Each ejector plate 206a, 206b is connected to each respective slideable support pin 180a, 180b and ejector plate 206c is connected to the slideable locator pin 190. Each ejector plate 206a–206c is received within the corresponding pneumatic cylinder 204a–204c which in turn is connected to the corresponding valve and solenoid unit 202a–202c. Each valve and solenoid unit 202a–202c is electrically connected to the PLC 230 and mechanically connected to a gas source 220. The PLC 230 independently sends out an electrical signal to each solenoid of each valve and solenoid unit 202a–202c. Each solenoid receives the signal and physically opens and closes the corresponding valve. This allows gas to be sent to each respective pneumatic cylinder 204a–204c and depending on the location of each ejector plate 206a–206c will cause each slideable support pin 180a, 180b and slideable locator pin 190 to extend into or retract out of the mold cavity 160. The ejector plate 206c may be coupled to the inner pin 192 such that the inner pin 192 extends or retracts a short distance and then catches the outer pin 194 and causes it to correspondingly extend or retract.

When the injection mold 150 is in the closed position only the slideable support pins 180a, 180b are used to support and symmetrically locate the aligned coil and cable assembly 140 within the mold cavity 160 (FIG. 9). Depending upon the configuration of the specific assembly 140 and the way molten plastic is filling around the assembly 140, one of the slideable support pins may be retracted sooner than another. Retracting the core pins is sequenced with the timing in the PLC 230 and may be calibrated until all of the slideable support pins 180a, 180b retract in a manner which allows the assembly 140 to remain centered both radially and axially within the mold cavity 160. Note that if the retraction of the slideable support pins 180a, 180b is not sequenced correctly the assembly 140 may shift to one side or the other in the mold cavity 160. This may cause an alteration of the electrical characteristics of the encapsulated transducer 10.

Referring to FIG. 7, the aligned coil and cable assembly 140 is radially and axially centered by way of the extended slideable support pins 180a, 180b and an extended slideable locator pin 190. The locator pin 190 centers the coil 40 and spaces it a predetermined distance from the front wall 166 of the mold cavity 160 by way of the inner pin 192 being received within the center void 42 of the coil 40 and the outer pin 194 abutting against the front face 44 of the coil 40. In addition, the slideable support pin 180b is extended into the lower cavity 158 and received within the indentation 136b for providing support thereto. Once the aligned coil and cable assembly 140 has been centered within the lower cavity 158, the locator pin 190 is withdrawn and the mold 150 is placed in a closed position (FIG. 9). At this time, the front face 44 of the coil 40 is precisely spaced from the front wall 166 of the mold cavity 160. This allows the encapsulated traducers 10 to include a substantially constant face thickness "T" (FIG. 2) and thus, a predetermined linear range. This is particularly important when manufacturing a plurality of encapsulated transducers 10 which are to include the same electrical characteristics. Furthermore, once the mold 150 is closed the cable 60 extends out of the opening 170 in the back wall 168 of the mold cavity 160. The engagement of the upper mold plate 152 and the lower mold plate 156 provides additional support by having the cable 60 cantilevered therebetween. The slideable support pin 180a extends into the upper cavity 154 from the upper mold plate 152 and comes into engagement with the indentations 136a of the alignment plug 120 thereby providing a top support to the aligned coil and cable assembly 140. A void completely surrounds the aligned coil and cable assembly 140 except of the course where the support pins 180a, 180b are abutting the assembly 140. An alternative embodiment to FIG. 9 may use fewer or more core pins 180a, 180b for centering and supporting the aligned coil and cable assembly 140 in the mold cavity 160.

The moldable material is injected into the mold cavity via runners 200 and gates 202 provided in the lower mold plate and/or the upper mold plate. Preferably, the moldable material includes polyphenylene sulfide (PPS) and includes a percentage of a Teflon® material. In addition, preferably twenty percent by weight of Teflon® is introduced into the moldable material in order to provide a means for providing a strong bond between the encapsulation 20 formed by the moldable material and the etched Teflon® dielectric 68 of the cable 60. The injection of the moldable material is continued until the mold cavity 160 is completely filled. Once the mold cavity 160 is filled, the support pins 180a, 180b are sequentially retracted such that the aligned coil and cable assembly 140 remains centered within the mold cavity 160. Note that an additional charge of moldable material may be introduced into the mold cavity 160 simultaneously with the retractions of the support pins 180a, 180b such that the aligned coil and cable assembly 140 is completely ensconced within the moldable material and all voids have been filled.

Figure 10:
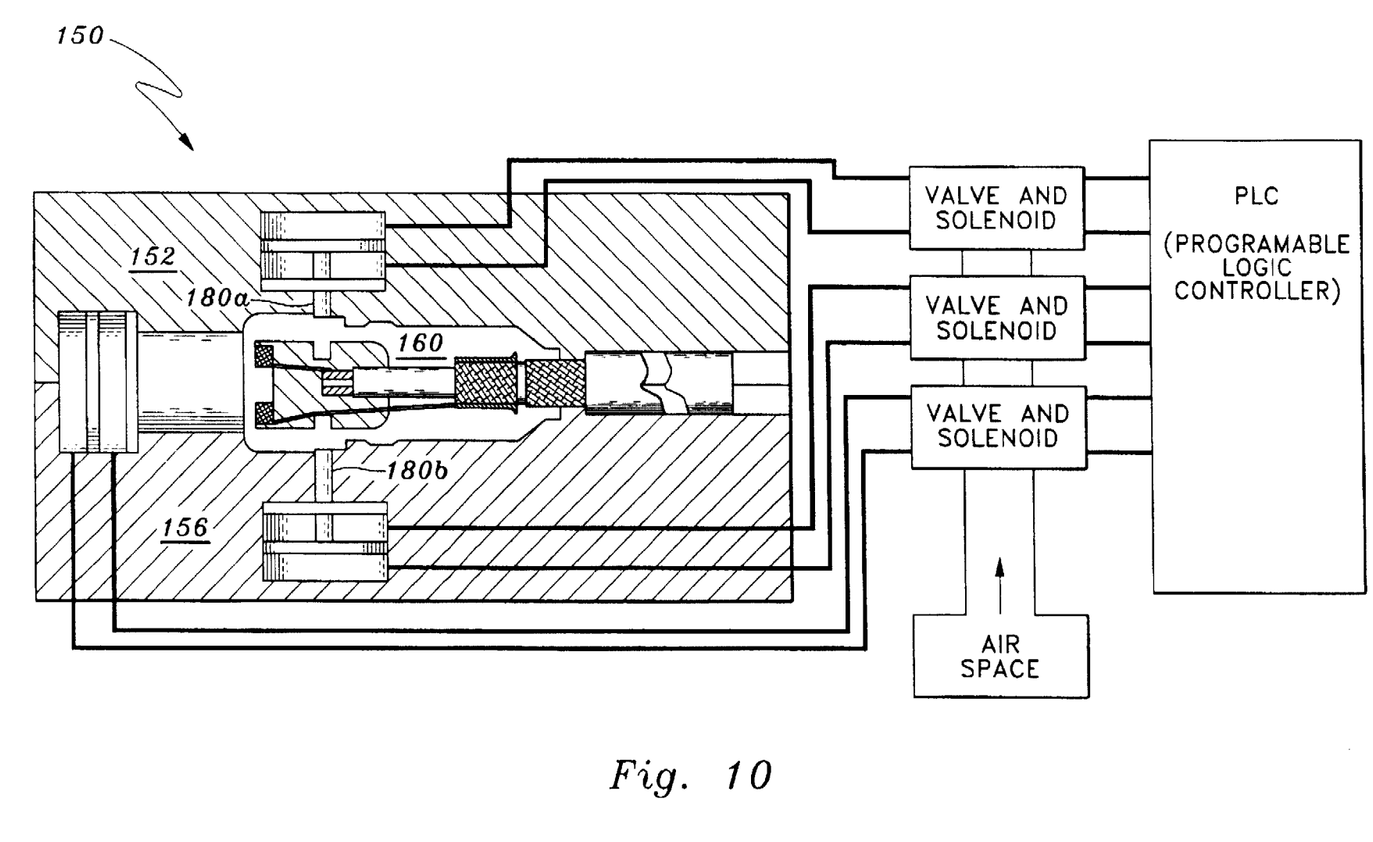
FIG. 10 is a simplified cross-sectional view of the mold in a closed position with the slideable support pins retracted after an injection molding according to the present invention is completed.

Referring to FIG. 10, once the process of injecting the moldable material into the mold cavity 160 is completed and the support pins 180a, 180b have been retracted, the mold 150 may be opened and the encapsulated transducer 10 allowed to cool in the lower mold plate 156. Once the encapsulated transducer 10 is cooled the bottom support pin 180b may be actuated to eject the encapsulated transducer 10 therefrom.

Figure 11:
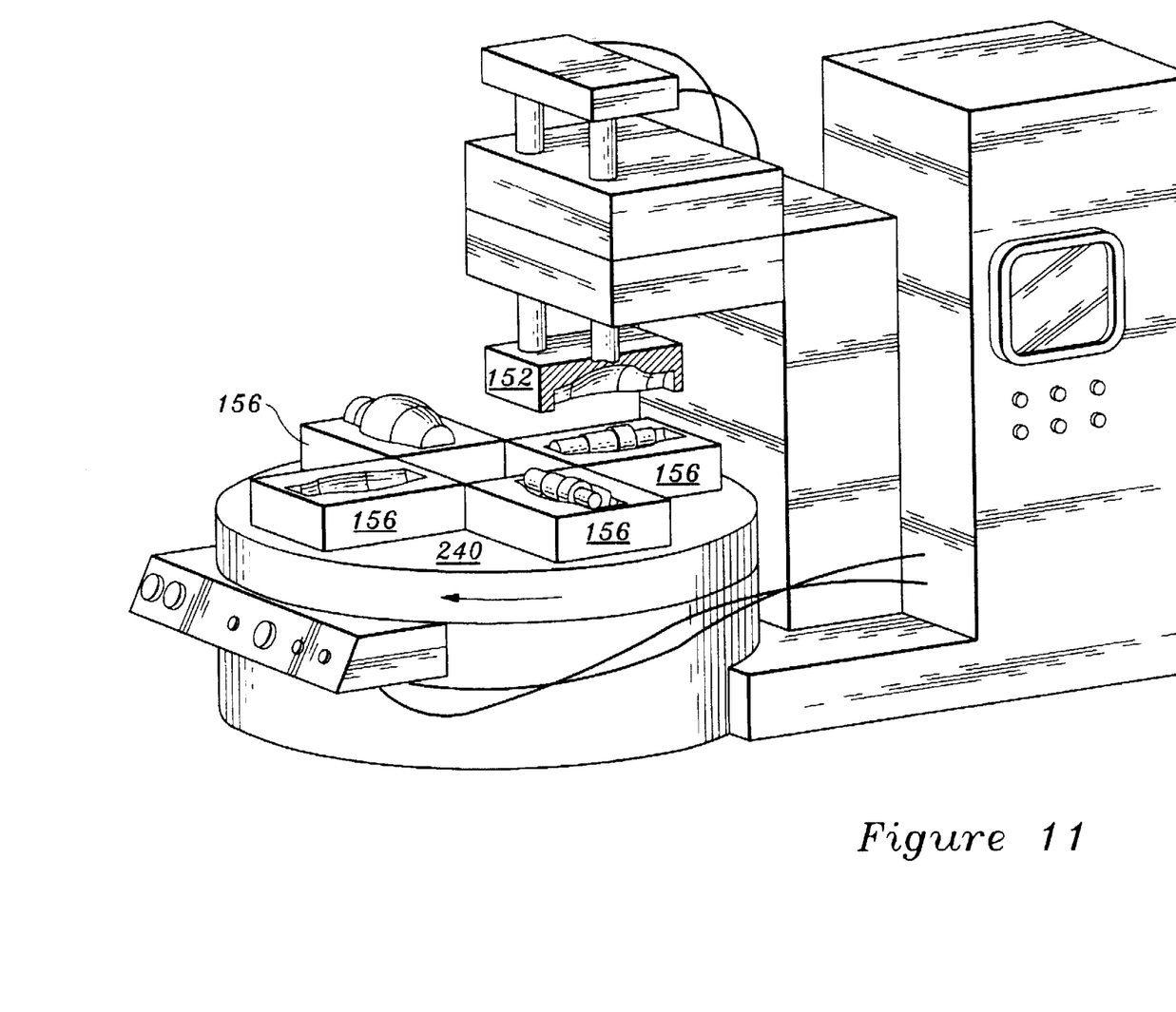
FIG. 11 is an elevational view of an injection mold used to mass produce a plurality of encapsulated transducers sequentially.

In mass production it is preferred that an injection molding device be provided which includes a single upper mold plate 152 and a plurality of lower mold plates 156 disposed on a rotatable table 240. The lower plates 156 may each be preloaded with a single aligned coil and cable assembly 140. Then, the upper mold plate 152 comes down onto the first inline lower mold plate 156 and the respective aligned coil and cable assembly 140 is encapsulated. Once the encapsulation process is completed the upper mold plate 152 is lifted and the table 240 is rotated to align a subsequent lower mold plate 156 with the stationary upper mold plate 152 so that the encapsulation process may be repeated. This process may continue for encapsulating a batch of aligned coil and cable assemblies 140.

After the encapsulation process is complete and the upper mold plate 152 is lifted from the lower mold plate 156, the table 240 is rotated and the corresponding encapsulated transducer 10 remains within the lower mold plate 156. For example, if the encapsulation processes is completed at a twelve o'clock position on the rotatable table 240 the encapsulated transducer 10 may remain within the lower mold plate 156 and allowed to cool until the table 240 has rotated from the twelve o'clock position to a six o'clock position were it ejected as delineated above. Now, after the encapsulated transducer 10 is ejected from the lower mold plate 156 the lower mold plate is reloaded with an aligned coil and cable assembly 140 and extends from the six o'clock position back to the twelve o'clock position as the table 240 is rotated.

Figure 1:
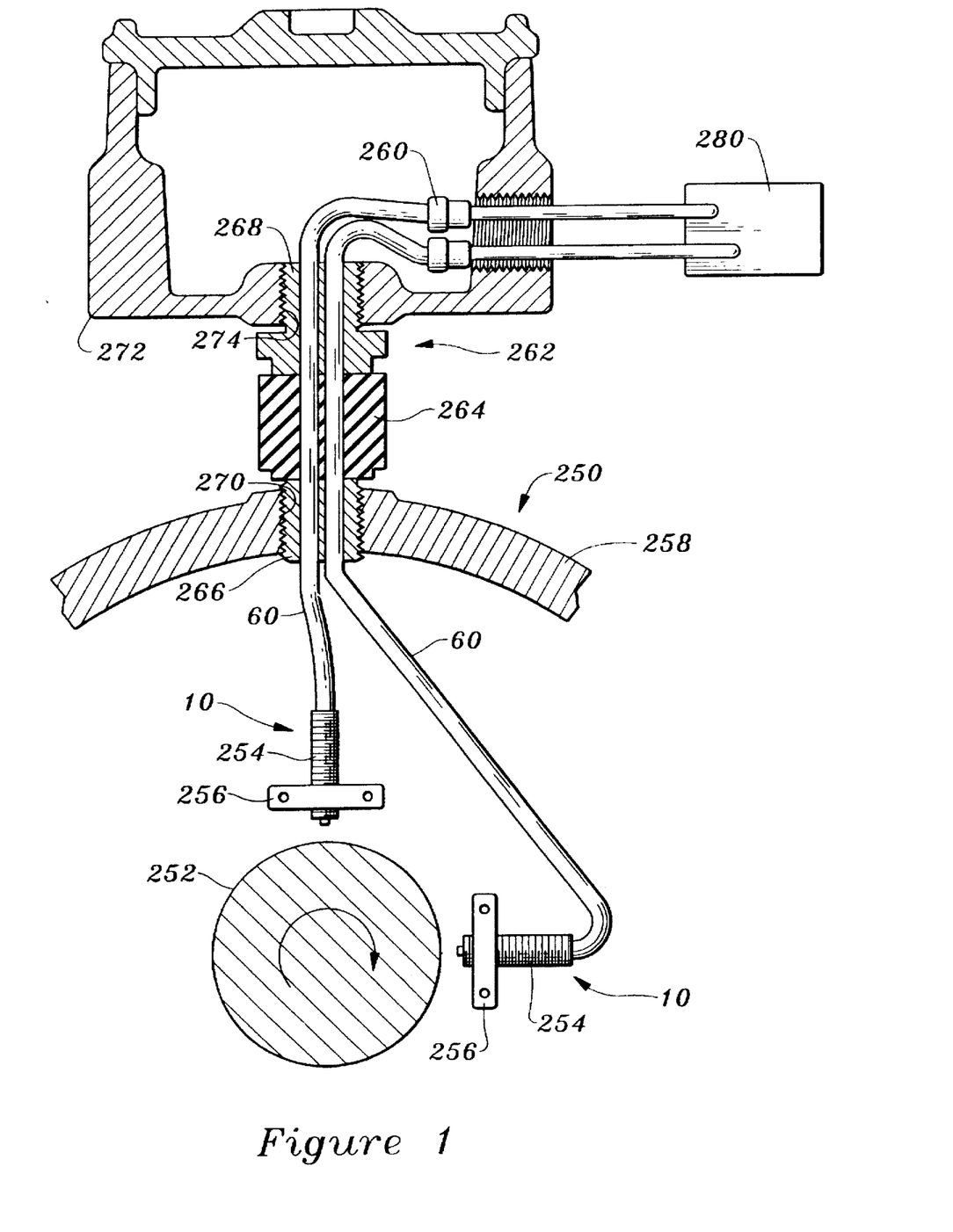
FIG. 1 is an elevational view of an encapsulated transducer with an alignment plug according to the present invention which is juxtaposed to a rotating shaft of a machine for monitoring the vibration thereof.

In use and operation, and referring to FIGS. 1 and 2, the encapsulated transducer 10 may, for example, be utilized as a proximity transducer for monitoring the vibrational characteristics of a rotating shaft 252 of a machine 250. In this environment the encapsulated transducer 10 operates on the eddy current principle and outputs a signal correlative to the spacing between the rotating shaft 252 and the sensing coil 40 of the encapsulated transducer 10.

Typically, the encapsulated transducer 10 is circumscribed by a threaded metal case 254 which is mounted adjacent the rotating shaft of the machine 250. A mounting means 256 is used to strategically mount the encapsulated transducer 10 a distance from the shaft such that a tangent of the shaft is perpendicular to the long axis "A" of the encapsulated transducer 10. The sensing coil 40 is electrically and mechanically connected to the cable 60. The cable 60 extends out the back end 24 of the encapsulation 20 and runs through a casing 258 of the machine 250 where it preferably terminates to a connection 260 capable of directly coupling to the electrical processing unit 280 or to an extension cable which in turn couples to the electrically processing unit 280.

Preferably, the cable is routed through the machine case 254 by passing through a rubber grommet 264 internal to an adaptor 262 operatively coupled to the machine case 258. The adaptor 262 includes a first end 266 having external and internal threads. The external threads of the adaptor are coupled with a threaded bore 270 in the machine case 258 for firmly connecting the adaptor thereto. In some instances, the internal threads of the first end of the adaptor allow the mounting of the encapsulated transducer 10 via the threaded metal case 254. A second end 268 of the adaptor 262 having external threads may be coupled to a threaded aperture 274 in a junction box 272 such that the junction box is mounted to the machine case 258. The junction box 272 allows any electrical connections operatively coupling the cable 60 to the electrical processing unit 270 to be enclosed in a weather-proof or explosion-proof environment.

In addition to use as a proximity transducer, the present invention may be employed very broadly in the monitoring and diagnosing the status of rotating and reciprocating machinery. One example is as a temperature transducer which would use a coil formed from a single wire thermocouple of the RTD type. The coil would be molded within the encapsulation 20 and the only change in the above delineated process may be in the use of perhaps a thinner overall encapsulation. This would provide for a suitable heat transfer to the RTD temperature sensing coil.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A transducer for monitoring the status of rotating equipment, comprising in combination:

a sensing element;

first and second leads extending from said sensing element;

a cable operatively coupled to said leads, an integrally formed one piece alignment plug capturing said sensing element and ensconcing an entirety of said first lead, at least a portion of said second lead and a leading portion of said cable for axially aligning said leading portion of said cable with said sensing element and rigidly spacing said sensing element from said leading portion of said cable for precisely setting the electromagnetic relationship between said sensing element and said cable; and a monolith of cured moldable material ensconcing said sensing element, an entirety of said alignment plug, and a portion of said cable defining a seamless mass circumscribing said sensing element and a portion of said cable and including a protective wall having an uninterrupted uniform thickness immediately forward of said sensing element.

2. The transducer of claim 1 wherein said sensing element is a coil having a front face, a back face and a body having an outer surface and a center void extending therethrough, said body extending between said front face and said back face.

3. The transducer of claim 2 wherein said cable includes at least a center conductor and a coaxial conductor separated from one another by at least one dielectric, said dielectric being pre-etched.

4. The transducer of claim 3 wherein at least one area proximate said leading end of said cable is stripped in a step-like fashion to expose a length of at least said center conductor, dielectric and coaxial conductor.

5. The transducer of claim 4 further including a front ferrule and a rear ferrule, said front ferrule having a bore with a diameter substantially matching the diameter of said center conductor and said rear ferrule having a bore with a diameter substantially matching the diameter of said coaxial conductor.

6. The transducer of claim 5 wherein at least a portion of said center conductor is electrically and mechanically connected within the bore of said front ferrule.

7. The transducer of claim 6 wherein at least a portion of said coaxial conductor is electrically and mechanically connected within the bore of said rear ferrule.

8. The transducer of claim 7 wherein said first lead of said coil is electrically connected to said front ferrule and said second lead of said coil is electrically connected to said rear ferrule.

9. The transducer of claim 8 further comprising said integrally formed alignment plug symmetrically disposed within said monolith of cured moldable material and axially aligning the coil along a long axis of said sensor and rigidly spacing the coil a predetermined distance from the stripped end of the cable.

10. The transducer of claim 9 wherein said alignment plug includes a front end having an annular recess defined by a center post integrally formed with a medial portion and an outer peripheral wall, said center post extending within the center void of said coil, said medial portion contacting and conforming to an entirety of said back face of said coil and said outer peripheral wall contacting and conforming to the outer surface of the body of said coil.

11. The transducer of claim 10 wherein said alignment plug further comprises a back end circumscribing a length of said stripped end of said cable and said medial portion integrally formed with and interposed between said front end and said back end of said alignment plug.

12. The transducer of claim 11 wherein said medial portion of said alignment plug ensconces said front ferrule and axially aligns said front ferrule along the long axis of said sensor.

13. The transducer of claim 12 wherein said medial portion of said alignment plug ensconces a length of said dielectric proximate said front ferrule.

14. The transducer of claim 13 wherein said cured moldable material forms a strong bond with said etched dielectric of said cable by forming an interface between said cured moldable material and said etched dielectric of said cable.

15. The transducer of claim 14 wherein said rear ferrule includes a shoulder locking into said monolith of cured moldable material to oppose axial forces from destroying the connection between said first and second leads and said center and coaxial conductors.

16. An encapsulated transducer for use in monitoring the status of rotating equipment in a harsh environment with an alignment plug having a leading end with an active element and a trailing end with an information transmitting medium emanating therefrom, formed by:
- integrally forming a locating means proximate said front face of said active element, said locating means defined by a portion of an air core of said active element unfilled by a center post integrally formed with said alignment plug and extending a distance within said air core;
- locating said active element in a mold cavity with a slideable locating pin coupling to said locating means, assuring proper registry in said mold cavity;
- protecting an outer surface of said active element with an outer peripheral wall integrally formed with said center post and contacting and contouring to an exterior surface of said active element wherein said outer peripheral wall, said center post and a portion of said alignment plug contacting and contouring to a back face of said active element define an annular recess integrally formed in said alignment plug;
- integrally forming a support receiving means with said alignment plug at a precise distance from said front face of said active element;
- supporting and locating said active element and said alignment plug in said mold cavity with a slideable support means coupling to said support receiving means and removing said locator means;
- injection molding a uniform uninterrupted front wall over a front face of said active element and a seamless body over said alignment plug and a portion of said information transmitting medium with a moldable material except for an area of support;
- removing said support means;
- injecting moldable material adjacent the support means for filling in said support receiving means heretofore occupied by said support means;
- wherein said active element is ensconced in a seamless mass of said moldable material having said uniform uninterrupted front wall abutting said front face of said active element and seamlessly transitioning into said body whereby said active element and said alignment plug are precisely located in said moldable material to accurately address the rotating equipment.

17. The encapsulated transducer as formed in claim 16 wherein the forming steps further include locating said active element in said mold cavity with an axially slideable support being received within said air core of said active element.

18. The encapsulated transducer as formed in claim 17 wherein the forming steps further include integrally forming grooves in said alignment plug at a precise length from a front face of said active element for forming said support receiving means.

19. The encapsulated transducer as formed in claim 18 wherein the forming steps further include supporting said active element and said alignment plug with a plurality of radially slideable supports and spacing said front face of said active element a precise distance from a front wall of said mold cavity by said grooves receiving said radially slideable supports.

20. The encapsulated transducer as formed in claim 19 wherein the forming steps further include providing a drive means to the axially slideable support and to the plurality of radially slideable supports for sliding each support into or out of the mold cavity.

21. The encapsulated transducer as formed in claim 20 wherein the forming steps further include providing a control means for signaling the drive means for independently sliding each support into or out of the mold cavity.

22. The encapsulated transducer as formed in claim 21 wherein the forming steps further include providing an alterable timing sequence for orchestrating the control means signaling of the drive means.

23. A transducer for monitoring the status of rotating equipment wherein a shaft of the rotating equipment is exposed to said transducer, comprising, in combination:
- means for mounting said transducer a distance from the shaft such that a tangent of the shaft is perpendicular to a long axis of said transducer,
- said transducer including an air core coil located proximate the shaft,
- a front portion of said transducer including an uninterrupted protective wall having uniform thickness along a forwardmost portion of said air core coil,
- said coil symmetrically disposed about the long axis, and
- a protective seamless encapsulation integrally formed with said uninterrupted protective front wall ensconcing said coil and a leading portion of a cable operatively coupled to said coil,
- an alignment plug embedded within said encapsulation and uniting said coil to said cable,
- said alignment plug including a front end molded flush with a front face of said coil, a back end molded over a length of said leading portion of said cable and, a medial portion contacting and contouring to a back face of said air core coil and integrally formed with and interposed between said front end and said back end of said alignment plug for capturing said air core coil and a portion of said cable;
- said medial portion of said alignment plug including an integrally formed outer peripheral wall contacting and contouring to an exterior surface of said air core coil and extending substantially parallel thereto;
- a center post integrally formed with said medial portion of said alignment plug and extending a distance into said air core of said coil;
- said outer peripheral wall, said medial portion and said center post defining an annular recess integrally formed in said alignment plug and contacting and contouring to said exterior surface, said back face and a portion of said air core of said coil,
- said cable extending away from said transducer to an electrical processing unit.

24. A transducer formed from injection molding, the forming steps including:
- attaching an air core coil to a conductor of a leading portion of a cable
- forming an alignment plug including a front end molded flush with a front face of said coil, a back end molded over a length of said leading portion of said cable and, a medial portion contacting and contouring to an entire back face of said coil and integrally formed with and interposed between said front end and said back end of said alignment plug for capturing said coil and said leading portion of said cable;
- said medial portion of said alignment plug including an integrally formed outer peripheral wall contacting and contouring to an exterior surface of said coil and extending substantially parallel thereto, and
- a center post integrally formed with said medial portion of said alignment plug and extending a distance into an air core of said coil;

said outer peripheral wall, said medial portion and said center post defining an annular recess integrally formed in said alignment plug and contacting and contouring to said exterior surface, said back face and a portion of said air core of said coil, forming a locating means proximate said front face of said coil, said locating means defined by a portion of said air core of said coil unfilled by said center post integrally formed with said alignment plug;

centering the coil within a mold cavity with a slideable coil support being received within said locating means, supporting the cable within the mold cavity with plural cable supports, orienting the cable to extend out from the mold cavity, retracting the coil support, injecting moldable material into the cavity of the mold to precisely ensconce said coil, said alignment plug and a length of the cable proximate the leading portion of the cable with a seamless mass of material including a uniform uninterrupted front wall abutting said front face of said active element and a body seamlessly transitioning therefrom whereby said active element and said alignment plug are precisely located in said seamless mass of moldable material, retracting the plural cable supports from the cable after the moldable material has been injected into the mold cavity, injecting moldable material adjacent the cable supports for filling in the areas heretofore occupied by said plural cable supports, allowing the moldable material to set, removing the thus-formed transducer from the mold as an integrated unit.

25. The transducer as formed in claim 24 wherein the forming steps further include centering and supporting the coil with an axially slideable coil support being received within said locating means.

26. The transducer as formed in claim 25 wherein the forming steps further include supporting the cable with plural radially retractable cable supports.

27. The transducer as formed in claim 26 wherein the forming steps further include preheating the mold to a temperature of moldable material in a molten state prior to injecting the moldable material into the cavity.

28. The transducer as formed in claim 27 wherein the forming steps further include maintaining the mold at the preheated temperature when injecting moldable material into the cavity.

29. The transducer formed in claim 28 wherein the forming steps further include injecting the moldable material at low pressure and low velocity to maintain the integrity of the coil, provide a good migration pattern of the moldable material in the cavity and to form a dense, sealed transducer.

30. The transducer formed in claim 29 wherein the forming steps further include providing a bonding agent to the moldable material for providing a strong bond between the cable and the moldable material once set.

31. The transducer of claim 1 further including means integrally formed with said alignment plug for receiving at least one slideable support pin for supporting said alignment plug within an injection mold cavity and spacing a front face of said sensing element a precise length from a front wall of the injection mold cavity for controlling said thickness of said front wall of said cured injection molded monolith of material.

32. The transducer of claim 31 further including a locating means for receiving at least one axially slideable locator pin for locating said sensing element and alignment plug within the injection mold cavity, said locating means defined by an area of an air core disposed in said sensing element.

33. A transducer for monitoring the status of rotating equipment, comprising in combination:

a coil having a front face, a back face, a body extending from said front face to said rear back and a central air core extending completely through said body;

first and second leads extending away from said coil;

a cable including at least one center conductor, a coaxial conductor and a dielectric separating at least one said center conductor from said coaxial conductor;

said cable having at least one end stripped in a step-like fashion to expose a length of a least said center conductor, dielectric and coaxial conductor;

a front ferrule operatively coupled to at least a portion of the exposed length of said center conductor at said one stripped end, and a rear ferrule operatively coupled to at least a portion of said coaxial conductor at said one stripped end;

an integrally formed one piece alignment plug including an outer protective peripheral wall contacting and conforming to an exterior surface of said body of said sensing element, a medial portion integrally formed with said outer peripheral wall and contacting and conforming to an entirety of said back face of said coil, and a center post integrally formed with said medial portion of said alignment plug and partially extending into said air core of said coil;

said peripheral wall, said medial portion and said center post defining an integrally formed annular recess capturing said coil wherein said medial portion ensconces an entirety of said first lead, an entirety of said front ferrule, at least a portion of said second lead and a length of said one stripped end of said cable;

said medial portion axially aligning said coil with said front ferrule and rigidly spacing said coil from said one stripped end of said cable wherein said spacing maintains an electromagnetic relationship between said coil and said cable;

a cured injection molded monolith of material ensconcing said coil, an entirety of said alignment plug, said rear ferrule and a portion of said cable proximate said rear ferrule, said material defining a seamless mass including an uninterrupted front wall contacting and conforming to an entirety of said front face of said coil and uniformly extending therefrom to provide said uninterrupted front wall with a uniform thickness which directly abuts and extends from said front face of said coil and which maximizes a linear range of said transducer for providing accurate and reliable measurements when in operation.

34. A transducer for monitoring the status of rotating equipment, comprising in combination:

an air core coil having a front face, a rear face, a body extending from said front face to said rear face and a central air core extending completely through said body;

first and second leads extending away from said coil;

a cable operatively coupled to said leads;

an integrally formed one piece alignment plug including an outer protective peripheral wall contacting and conforming to an exterior surface of said body of said coil, a medial portion integrally formed with said outer peripheral wall and contacting and conforming to an entirety of said rear face of said coil, and a center post integrally formed with said medial portion of said alignment plug and partially extending into said air core of said coil;

said peripheral wall, said medial portion and said center post defining an integrally formed annular recess capturing said coil wherein said medial portion ensconces an entirety of said first lead, at least a portion of said second lead and a leading portion of said cable;

said medial portion axially aligning said coil with the leading portion of said cable and rigidly spacing said coil from said cable wherein said spacing maintains an electromagnetic relationship between said coil and said cable;

a cured injection molded monolith of material ensconcing said coil, an entirety of said alignment plug and a portion of said cable proximate a rear of said alignment plug, said material defining a seamless mass including an uninterrupted front wall contacting and conforming to an entirety of said front face of said coil and uniformly extending therefrom to provide said uninterrupted front wall with a uniform thickness which immediately extends from said front face of said coil and which maximizes a linear range of said transducer for providing accurate and reliable measurements when in operation.

* * * * *

UNITED STATES PATENT AND TRADEMARK OFFICE
CERTIFICATE OF CORRECTION

PATENT NO. : 5,712,562
DATED : January 27, 1998
INVENTOR(S) : Van Den Berg, Dave It is certified that error appears in the above-indentified patent and that said Letters Patent is hereby corrected as shown below:

On the title page, item [19] change inventor's name from "Berg" to --Van Den Berg--.

Signed and Sealed this

Twenty-first Day of April, 1998

Attest:

BRUCE LEHMAN

Attesting Officer

Commissioner of Patents and Trademarks